June 20, 1972 — A. KILGUS — 3,671,108
TEMPERATURE COMPENSATING DEVICE AND LENS
SYSTEM INCLUDING SAME
Filed July 10, 1970

INVENTOR
ALFRED KILGUS

Robert W. Hampton
D. Peter Hochberg

BY

ATTORNEYS

United States Patent Office 3,671,108
Patented June 20, 1972

3,671,108
TEMPERATURE COMPENSATING DEVICE AND LENS SYSTEM INCLUDING SAME
Alfred Kilgus, Biberacher Strasse 2,
Stuttgart-Wangen, Germany
Filed July 10, 1970, Ser. No. 53,878
Claims priority, application Germany, July 12, 1969,
G 69 27 722.1
Int. Cl. G02b 7/02
U.S. Cl. 350—253                          11 Claims

ABSTRACT OF THE DISCLOSURE

A lens system includes an annular temperature compensating ring disposed between lens components, the ring having a thermal coefficient of expansion which is sufficiently high to compensate for changes in the focal length of the lens system resulting from temperature-induced changes in the refractive index of the lens elements. In a preferred embodiment, the temperature compensating device comprises a plurality of V-shaped projections extending axially from one side of the annular ring, the shape of the projections and of the notches defined thereby being such that the axial length of the projections changes with temperature-induced changes in the size of the ring.

BACKGROUND OF THE INVENTION

Field of the invention

The present invention relates means for compensating for changes in the index of refraction of the leans elements of a lens system resulting from temperature variations in the system. More particularly, the invention relates to a photographic objective in which a temperature responsive compensating element is arranged between two lens elements to compensate mechanically for changes in focal length caused by changes in the refractive index of the lens elements due to temperature variations.

Description of the prior art

The index of refraction of a lens is known to decrease with increases in temperature and to increase with decreases in temperature. This phenomenon is particularly severe in plastic lenses, where the change in the index of refraction is typically about —.00013 per degree centigrade. Since the focal length of a lens is a function of the refractive index of the leans, means for compensating for changes in focal length due to temperature variations to maintain the focus of the lens are desirable. For this reason, a variety of devices have been provided for compensating for temperature-caused variations in the refractive index of the lenses.

A photographic objective including a compensating spacer is described in French Pat. 1,329,293. The objective described therein comprises a plurality of lens elements which are separated from each other by means of a spacer which effects a change in the separation of the lens elements in response to temperature variations, to compensate for changes in the focal length of the objective caused by such temperature variations. The change in length of the compensating spacer with temperature differs from that of the remaining lens elements and from the overall linear dimensions of the objective.

According to this patent, plastic material is used for at least some of the lens elements, and the compensating spacer, is made of a plastic material whose coefficient of thermal expansion is such as to provide compensation for the temperature caused changes in focal length of the lens system. German patent DAS 1,128,279 teaches a photographic camera comprising a plastic housing, wherein a film gate and a lens support are framed by plastic members which are fitted into each other and whose plastic materials have about the same coefficient of thermal expansion and/or the same specific change in length resulting from swelling caused by the absorption of moisture. The coefficient of thermal expansion and/or the specific change in length due to the swelling of the plastic members is about one and a half to three times as great as that of the film gate and the lens support, respectively. The purpose of this arrangement is to make use the different thermal expansion or the different amount of swelling caused by changing atmospheric moisture of various plastic materials, for compensating for the considerable changes in dimension in accordance with the known principle of the compensated chronometer pendulum.

SUMMARY OF THE INVENTION

It is an object of the present invention to compensate for changes in the focal length of a lens system resulting from changes in the index of refraction of the system due to temperature variations.

It is a further object to compensate for such temperature-caused changes in a fixed-focus lens system.

It is still a further object to make such compensation in an optical system for a photographic objective having plastic lens elements.

Another object is to make such compensation mechanically.

It is yet another object to provide an improved temperature compensating device for an optical lens system.

It is still another object to provide an improved photographic objective which is easy to manufacture and comprises plastic lens elements, in which a compensating element is mounted between two lens elements to compensate for changes in focal length resulting from temperature-caused changes in the refractive index of the lens elements.

The foregoing and other objects, which will be apparent to those skilled in the art, are achieved according to the present invention by a provision of a temperature compensating element made of a plastic material having a very high coefficient of expansion, e.g. trolene, a rubber substitute. This element is in the form of a resilient ring and mounted between two lens components for which the temperature compensation is to be made. In a preferred embodiment the resilient ring has distributed on its circumference a plurality of V-shaped projections whose height increases with rising temperature due to expansion of the resiilent ring and decreases with falling temperature due to contraction of said ring. Changes in the height of the projections effect corresponding changes in the spacing of the lens elements.

In another embodiment a set of oblique surfaces extend from one of the lens elements in between the sides of each V-shaped projections of the ring. Any further rise in temperature beyond a given point causes the base edges of the V-shaped projections to come into engagement with oblique surfaces of rearward extensions of the front lens to effect a further separation of the lens elements.

BRIEF DESCRIPTION OF THE DRAWINGS

In the detailed description to follow, reference is made to the accompanying drawings in which.

DESCRIPTION OF THE PREFERRED EMBODIMENT

Figure 1:
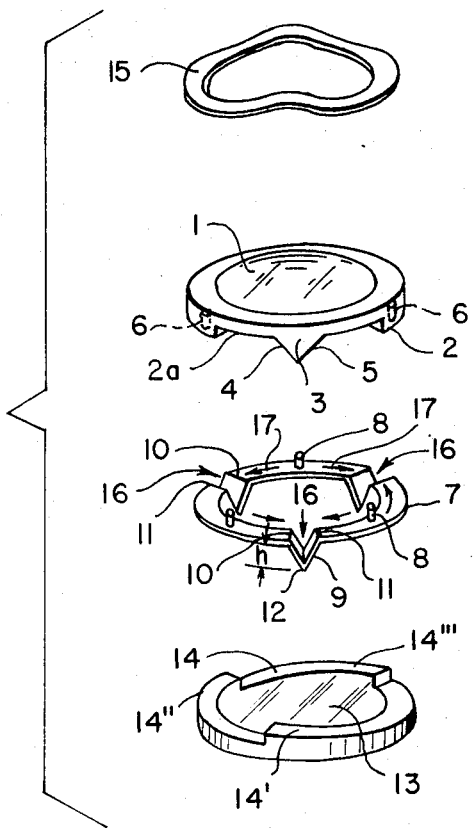
FIG. 1 is an exploded view of a portion of photographic objective according to the invention.
Figure 2:
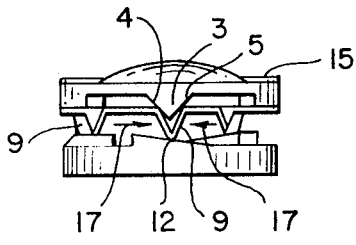
FIG. 2 is a partially sectioned view of the parts shown in FIG. 1 in their assembled forms.
Figure 3:
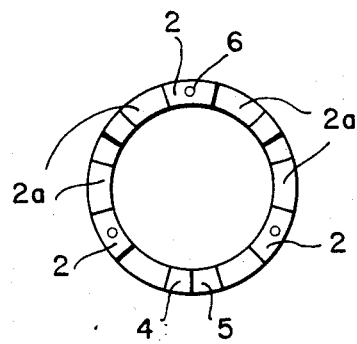
FIG. 3 is a bottom view of the front lens of the assembly.

Referring to the drawings, a camera objective is shown comprising a front lens 1 and a negative rear lens 13, the two lenses being aligned on their optical axes. The rearward side of the front lens 1 facing lens 13 is provided with a rear engaging surface 2.

Surface 2 includes a planar portion interrupted by three recesses 2a. From the center of each of recesses 2a extends a triangular portion 3. In addition engaging surface 2 is provided with one bore 6 in each of the sections disposed between recesses 2a. Mounted between front lens 1 and rear lens 13 is an annular compensating ring 7 made of a plastic material such as trolene having a very high coefficient of expansion. On the side of ring 7 facing the front lens 1, three equally spaced pins 8 are provided for reception by bores 6 of the front lens 1 to align the resilient ring with the optical axes of the lenses. The annular surface of the resilient ring engages the segmented engaging surface 2 of the front lens 1 at a given ambient temperature such as 25° C. Furthermore, the resilient ring has distributed on its circumference three V-shaped projections 9 extending axially opposite pins 8 and being arranged therebetween. Each projection 9 defines a notch 16 in the forward side of the ring. The apex 12 of each notch 16 are in engagement with one of the three cam sections 14′, 14″ and 14‴ into which edge 14 is divided.

The operation of the device is as follows:

At a certain temperature, such as 25° C., the components of the objective are positioned to a predetermined fixed focus value. When a camera equipped with such an objective is exposed to heat source such as sunlight, the temperature of the objective rises. This temperature rise effects a decrease in the refractive indices of the lens elements, and in effect moves the lens system rearwardly towards an "infinity setting." Resilient ring 7 which is held in the front lens by pins 8, expands in the direction of the arrows 17 when its temperature rises. This expansion results in an increase of the axial length of the V-shaped projections 9. When the temperature rises further, the resilient ring expands more and more, so that the base edges 10 and 11 defined by the forward edges of the V-shaped notches 16, come into engagement with the oblique surfaces 4 and 5 of the triangular extensions 3 of the front lens 1 which results in a further increase of height $h$. The movement thus produced adjusts the focus of the objective away from the temperature induced "infinity setting," and increases the separation of lens elements 1 and 13 towards a "close-up setting."

In order to decrease the separation of the lens elements when the temperature falls, a retaining spring 15 is provided for urging resilient ring 7 rearwardly, thereby adjusting the temperature-caused "close-up setting" towards an "infinity setting" by decreasing the separation of the lens elements in proportion to the change in focal length due to the temperature decrease.

Thus the invention has provided a simple yet effective device for adjusting the separation of a plurality of lens elements to compensate for changes in the focal length of the lens system which are caused by temperature variations. The invention makes use of the expansion of a contoured ring for increasing the spacing between the lens elements as the temperature rises, and of a spring member for decreasing the spacing of the lens elements as the temperature drops. The invention has been described in detail with particular reference to a preferred embodiment thereof, but it is to be understood that variations and modifications within the spirit and scope of the invention will be apparent to those skilled in the art to which the invention pertains.

I claim:

1. A mechanism for moving an optical member along an optical axis in response to a change in temperature, said mechanism comprising:
   first and second bearing members and means for yieldably urging said bearing members together wherein:
   said first bearing member comprises a material with a high coefficient of expansion over at least a given temperature range;
   one of said bearing members is coupled to the optical member to transmit relative movement between said bearing members to the optical member; and
   one of said bearing members has at least one bearing surface which defines a notch in said member and the other bearing member has at least one bearing surface which forms a protrusion on said member, said bearing members being positioned so that said protrusion is aligned with and extends into said notch with said bearing surfaces being urged into contact by said urging means over at least a portion of said temperature range, and the bearing surface of said first member varying its relative orientation with respect to the bearing surface of said second member in response to a change in temperature to vary the depth of penetration of said protrusion in said notch when said bearing surfaces are in contact and thereby cause relative movement between said bearing members and consequent movement of the optical member.

2. A mechanism for moving an optical member along an optical axis in response to a change in temperature, said mechanism comprising:
   first and second bearing members and means for yieldably urging said bearing members together wherein:
   one of said bearing members is coupled to the optical member for movement therewith relative to the other bearing member;
   said first bearing member comprises a material with a high coefficient of expansion over at least a given temperature range; and
   one of said bearing members has at least one pair of bearing surfaces which define a notch in that member and the other of said bearing members has at least one pair of bearing surfaces which form a protrusion on that member, said bearing members being positioned so that said protrusion is aligned with and enters into said notch with said bearing surfaces being urged into contact by said urging means over at least a portion of said temperature range, the angle of intersection of the planes defined by said notch defining bearing surfaces being generally smaller over at least said temperature range than the angle of intersection of the planes defined by said protrusion forming bearing surfaces, and the bearing surfaces of said first bearing member changing their angle of intersection in response to a change in temperature to vary the depth of penetration of said protrusion in said notch when said bearing surfaces are in contact and thereby cause relative movement between said bearing members and consequent movement of the optical member.

3. A mechanism as in claim 2 wherein said first bearing member further has at least one pair of projecting surfaces disposed adjacent to said notch defining bearing surfaces to form a projection on that member into which said notch extends, said projection extending a predetermined axial distance from that member at a given temperature within said temperature range, and the bearing surfaces of said first bearing member changing their angle of intersection in response to a change in temperature to vary said axial distance and thereby cause relative movement between said bearing members and consequent movement of the optical member.

4. An optical system having an optical axis and comprising:
   an optical member movable along the optical axis in response to a change in temperature;
   a temperature responsive member comprising a material having a high coefficient of expansion, a plurality of projections extending a predetermined axial distance from said member at a given temperature and a plurality of notches, each said notch being defined by a pair of walls which extend into one of said projections, said walls intersecting at a predetermined angle at said given temperature and said walls varying said angle of intersection in response to a change in temperature to vary said axial distance; and means for coupling said optical member and said temperature responsive member whereby a change in said axial distance causes axial movement of said optical member.

5. An optical system as in claim 4, wherein said coupling means further includes a plurality of protrusions, at least one of said protrusions being disposed so as to extend into one of said notches, said walls varying said angle of intersection in response to a change in temperature to reduce the width of said notch until said walls come into engagement with said protrusion and to reduce the depth of penetration of said protrusion in said notch upon further reduction in the width of said notch, whereby a change in said depth of penetration causes axial movement of said optical member.

6. An optical system having an optical axis and comprising:
    an optical member movable along the optical axis in response to a change in temperature;
    a temperature responsive member comprising a material having a high coefficient of expansion and a plurality of notches, each said notch being defined by a pair of walls which extend into said member, said walls intersecting at a predetermined angle at a given temperature and said walls varying said angle of intersection in response to a change in temperature to vary the width of said notch; and
    means for coupling said optical member and said temperature responsive member, said coupling means including a plurality of protrusions, at least one of said protrusions being disposed so as to expand into one of said notches, said walls varying said angle of intersection in response to a change in temperature to reduce the width of such notch until said walls come into engagement with said protrusion and to reduce the depth of penetration of said protrusion in said notch upon further reduction in the width of said notch, whereby a change in said depth of penetration causes axial movement of said optical member.

7. An optical system as in claim 6, wherein said temperature responsive member further includes a plurality of projections extending a predetermined axial distance from said member at said given temperature, each said projection being disposed so as to receive one of said notches, said walls varying said angle of intersection in response to a change in temperature to vary said axial distance; and
    said coupling means further includes means for coupling said optical member and temperature responsive member whereby a change in said axial distance causes axial movement of said optical member.

8. An optical system having an optical axis and comprising:
    an optical member movable along the optical axis in response to a change in temperature;
    means for mounting said optical member, said mounting means including a plurality of protrusions; and
    a temperature responsive member comprising a material having a high coefficient of expansion and a plurality of notches, each said notch being defined by a pair of walls extending into said member which intersect at a predetermined angle at a given temperature, said temperature responsive member being disposed so that at least one of said protrusions extends into one of said notches, said walls varying said angle of intersection in response to a change in temperature to reduce the width of said notch until said walls come into engagement with said protrusion and to reduce the depth of penetration of said protrusion in said notch upon further reduction in the width of said notch, whereby a change in said depth of penetration causes axial movement of said optical member.

9. An optical system as in claim 8, wherein said temperature responsive device further includes a plurality of projections extending a predetermined axial distancce from said member at said given temperature, each said projection being disposed on said member so as to receive one of said notches, said walls varying said angle of intersection in response to a change in temperature to vary said axial distance; and
    said system further comprising means for coupling said optical member and said temperature responsive-member whereby a change in said axial distance causes axial movement of said optical member.

10. An optical system having an optical axis and comprising:
    an optical member;
    a mounting member comprising means for mounting said optical member, a plurality of axial protrusions and a plurality of bearing surfaces, each said bearing surface having a recess extending axially into said mounting member;
    a temperature responsive member comprising a material having a high coefficient of expansion, a pluarity of mounting pins, a plurality of bearing surfaces, a plurality of projections and a plurality of notches, said mounting pins being adapted to enter into said recesses on said mounting member when said respective bearing surfaces on said mounting and said temperature responsive members are brought into contact, said projections extending a predetermined axial distance from said member at a given temperature, each said notch being defined by a pair of bearing walls extending into one of said projections, said bearing walls intersecting at a predetermined angle at said given temperature, said corresponding projections and notches being positioned so that each of said protrusions on said mounting member extends into a notch when said bearing surfaces are brought into contact and said mounting pins enter said recesses, and said walls varying said angle of intersection in response to a change in temperature to vary said axial distance, to reduce the width of said notch until said walls come into engagement with said protrusion and to reduce the depth of penetration of said protrusions in said notches upon further reduction in the width of said notch;
    a focussing member comprising a bearing surface for engagement with said projections on said temperature responsive member; and
    means for yieldably urging said mounting member, said temperature responsive member and said focussing member together whereby said optical member is initially at a predetermined position with respect to said focussing member at såid given temperature and said optical member is displaced from said predetermined position by a change in said axial distance or a change in said depth of penetration.

11. An optical system as in claim 10, wherein said bearing surface on said focussing member comprises a plurality of cam surfaces, each positioned for engagement with the apex of one of said projections on said temperature responsive member, whereby said lens may be displaced from said predetermined position at said given temperature by movement of said projections under urging of said cam surfaces.

References Cited
UNITED STATES PATENTS 3,205,774  9/1965  Estes _____ 350—253
2,441,104  5/1948  Schubert et al. _____ 350—252

DAVID SCHONBERG, Primary Examiner

M. J. TOKAR, Assistant Examiner